Patented May 21, 1935

UNITED STATES PATENT OFFICE 2,002,264

ANTHRAQUINONE DERIVATIVE AND PROCESS OF MAKING SAME

Hermann Hauser, Basel, and Max Bommer, Riehen, near Basel, Switzerland, assignors to the firm Society of Chemical Industry in Basle, Basel, Switzerland No Drawing. Application May 31, 1932, Serial No. 614,610. In Switzerland June 29, 1931

5 Claims. (Cl. 260—60)

This invention relates to the manufacture of new anthraquinone derivatives and their application as dyestuffs. It comprises the process of making these derivatives as well as the derivatives themselves.

The invention is based on the observation that in 1-acylamido-3-halogen-anthraquinones, obtainable for example by acylating 1-amino-3-halogen-anthraquinones, the halogen may be exchanged in a surprisingly smooth manner, with elimination of hydrogen halide or a salt thereof, for the most various residues.

The reaction is carried out by causing compounds containing at least one replaceable atom of hydrogen or a metal attached to nitrogen, oxygen or sulfur to react on 1-acylamido-3-halogen-anthraquinones.

Among the 1-acylamido-3-halogen-anthraquinones which may be used in the present process the following may for example be mentioned:— 1 - formylamido - 3 - bromanthraquinone, 1 - acetylamido - 3 - bromanthraquinone, 1-benzoylamido-3-bromanthraquinone, 1-(4'-chloro-) benzoylamido-3-chloranthraquinone, 1-naphthoylamido-3-chloranthraquinone, 1-2'-ethoxy-) naphthoylamido-3-bromanthraquinone, 1 - phenylsulfamido-3-bromanthraquinone 1-naphthylsulfamido-3-chloranthraquinone, 1-(1'-anthraquinonecarbonyl-) amido-3-chloranthraquinone, 1-(2'-anthraquinonecarbonyl-) amido-3-bromanthraquinone.

Compounds containing at least one replaceable atom of hydrogen or a metal attached to nitrogen, oxygen or sulfur, and which may be converted with the 1-acylamido-3-halogen-anthraquinones are for example the following:—alcoholates, phenolates, xanthates, mercaptans, thiophenols, thionaphthols, sulfamides, ammonia, primary and secondary amines of the aliphatic or aromatic series, such as methylamine, glycocoll, aniline, toluidine, phenylenediamine, naphthylamine, or the highly condensed ring systems, such as aminoanthraquinones, aminopyranthrones, aminoanthanthrones, aminodibenzanthrones.

The reaction of the 1-acylamide-3-halogenanthraquinones with the compounds just named is preferably carried out in a diluent of high boiling point in presence of agents that bind acids, such as anhydrous sodium acetate, potassium acetate, calcined alkali carbonates, copper oxide, magnesium oxide, and of catalysts, such as metallic copper and its compounds. The yields are generally approximately quantitative, and the products of the reaction are almost always obtained in crystalline form.

The products obtained in this manner may already themselves be valuable dyestuffs, but they may also be used as intermediate products for making further dyestuffs.

The new anthraquinone derivatives obtainable according to the present process yield in dyeing valuable tints of very good fastness properties. For dyeing they can also be used in the form of their leuco-compounds, for instance their leuco-esters.

The following examples illustrate the invention, the parts being by weight:—

Example 1

10 parts of 1-benzoylamido-3-bromanthraquinone, obtainable by benzoylating 1-amino-3-bromanthraquinone (compare Berichte der deutschen Chemischen Gesellschaft, 1916, vol. 49, page 2154), 100 parts of phenol, 10 parts of potassium carbonate and 0.2 part of copper powder are heated together to boiling for 4 hours, a portion of the phenol being distilled during the reaction. The mass, at about 80° C., is diluted with 150 parts of alcohol; after stirring for a short time and cooling to 50° C. the whole is filtered. The new compound of the probable formula

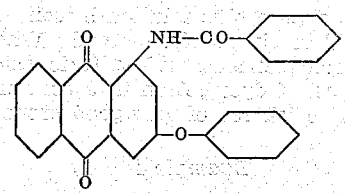

forms greenism yellow microscopically small tablets which, after several recrystallizations from nitrobenzene, melt at 225° C. In sulfuric acid of 96 per cent. strength the dyestuff disolves to a pure red solution, whereas the parent material dissolves in the same solvent to a yellow orange solution. The new dyestuff obtained dyes cotton from a cold vat greenish yellow shades.

Example 2

10 parts of 1-benzoylamido-3-bromanthraquinone, 50 parts of paratoluidine, 3 parts of potassium acetate and 0.2 part of copper acetate are heated together for 24 hours in a reflux apparatus. The mass gradually becomes brown. While it is at a temperature of 70° C., 150 parts of alcohol are added and the mixture is stirred until the separation of the new compound is complete. This compound of the probable formula

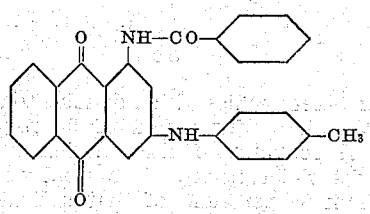

is filtered and washed first with alcohol and then with water. The product thus obtained is a brownish crystalline powder. When recrystallized from nitrobenzene or pyridine it is obtained in the form of long needles. It dyes cotton from a cold vat bright red shades. In concentrated sulfuric acid it dissolves to a solution which is at first yellow olive but rapidly becomes bluish and finally pure blue; this change of color occurs particularly quickly in sulfuric acid monohydrate at temperatures between 20 and 30° C. By gentle heating (about 100° C.) the blue color of the solution changes to red violet.

*Example 3*

12 parts of 1-benzoylamido-3-bromanthraquinone, 8 parts of 1-aminoanthraquinone, 8 parts of potassium acetate, 1 part of copper acetate and 200 parts of nitrobenzene are heated together to boiling for 6 hours while stirring. The whole is filtered at 50° C. and the solid matter is washed with nitrobenzene, then with alcohol and finally with hot water. There are obtained 11 parts of a red crystalline powder. This product of the probable formula

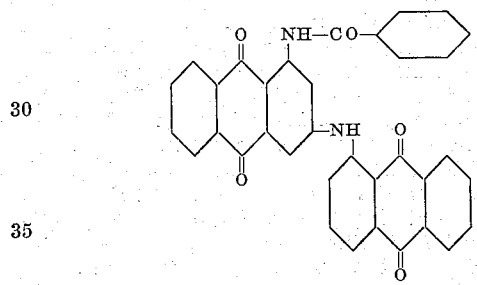

dissolves to a pure blue solution in concentrated sulfuric acid or chlorosulfonic acid. When precipitated from concentrated sulfuric acid solution the dyestuff dyes cotton in a cold or warm vat a strong brick red of very good properties of fastness.

*Example 4*

10 parts of 1-benzoylamido-3-bromanthraquinone, 7 parts of 1,4-aminomethoxyanthraquinone, 5 parts of anhydrous sodium acetate, 1 part of copper acetate and 150 parts of nitrobenzene are heated together to boiling for 6 hours. The whole is filtered at 50° C. and the solid matter washed with nitrobenzene, alcohol and finally with hot water. The new compound of the probable formula

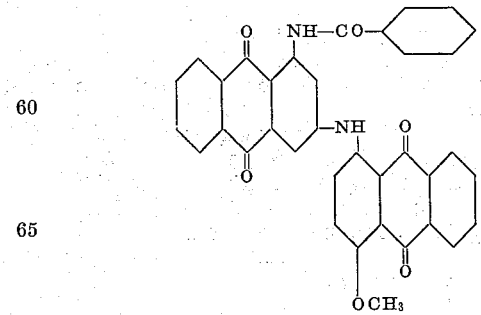

forms long violet needles which dissolve to a pure blue solution in sulfuric acid of 96 per cent. strength. Introduction of this solution into water produces violet flocks. The yield amounts to more than 80 per cent. of that indicated by theory. When precipitated from the sulfuric acid solution the product dyes cotton in the vat bordeaux tints of very good properties of fastness.

*Example 5*

10 parts of 1-benzoylamido-3-bromanthraquinone, 9 parts of 1,5-monobenzoyldiaminoanthraquinone, 5 parts of anhydrous sodium acetate, 1 part of copper acetate and 150 parts of nitrobenzene are heated together to boiling for 6 hours and the mass is worked up as described in Example 3. There are obtained well formed small red needles in a yield of more than 90 per cent. of that indicated by theory. By precipitating the dyestuff of the probable formula

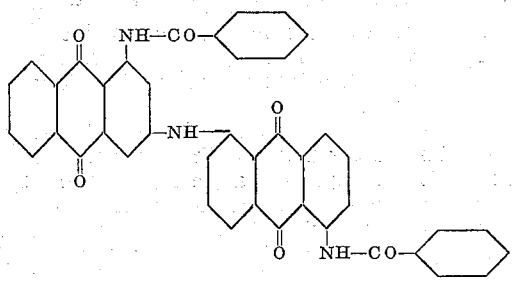

from sulfuric acid of 93 per cent. strength at a temperature below 5° C. there is obtained a red paste. This compound dyes cotton in a cold or warm hydrosulfite vat strong brownish red tints of good properties of fastness.

When 1,8-monobenzoyldiaminoanthraquinone is used instead of the 1,5-compound a similar dyestuff of the probable formula

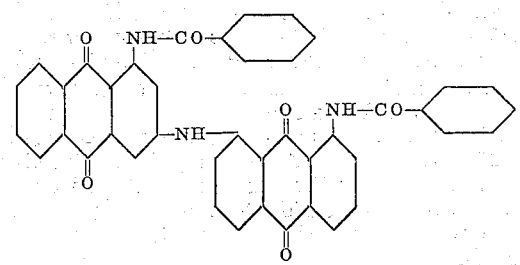

of very good properties of fastness is obtained.

*Example 6*

10 parts of 1-benzoylamido-3-bromanthraquinone, 2.4 parts of 1,5-diaminoanthraquinone, 5 parts of anhydrous sodium acetate, 1 part of copper acetate and 150 parts of nitrobenzene are together heated to boiling for 6 hours as described in Example 3. The new compound of the probable formula

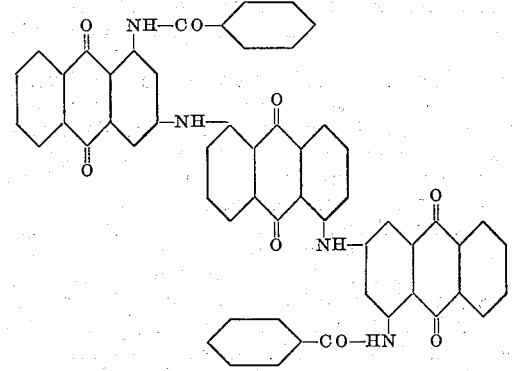

is isolated by filtration at about 50° C. It is a red crystalline powder, which after precipitation from concentrated sulfuric acid solution dyes cotton in the vat strong bordeaux tints of very good properties of fastness.

Example 7

A mixture of 10 parts of 1-benzoylamido-3-bromanthraquinone, 10 parts of 1,4-monobenzoyldiaminoanthraquinone, 5 parts of potassium acetate, 1 part of copper acetate and 200 parts of nitrobenzene is converted as described in Example 3, into the corresponding anthrimide of the probable formula

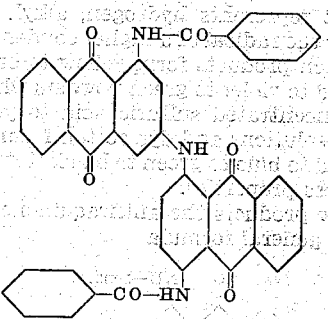

The compound dyes cotton in a cold or warm hydrosulfite vat brown-red tints of good properties of fastness.

Example 8

20 parts of 1-benzoyl-amido-3-bromanthraquinone, 20 parts of para-toluenesulfamide, 10 parts of anhydrous sodium acetate, 1 part of copper acetate and 200 parts of nitrobenzene are heated to boiling for 5 hours in a reflux apparatus. The whole is then cooled to 80° C., 200 parts of alcohol are added, the whole is stirred for some time and the reaction product is separated by filtering. The new compound of the probable formula

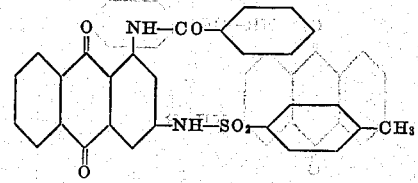

is obtained in the form of microscopic yellow needles; it melts at 345° C. whilst darkening. It dissolves in sulfuric acid of 97 per cent. strength to a pure raspberry-red solution, whilst the parent material dissolves in the same solvent to an orange solution. By allowing the raspberry-red solution in sulfuric acid to stand for some time at ordinary temperature and then pouring it on ice there is obtained a new compound having a melting point of 298-299° C. When recrystallized from nitro-benzene it forms brown crystals; it is apparently 1-benzoylamido-3-aminoanthraquinone. By hydrolyzing the products of melting points 345° C. and 298-299° C. with concentrated sulfuric acid at 110-120° C. there is obtained 1,3-diaminoanthraquinone.

Example 9

20 parts of 1-benzoyl-amido-3-bromanthraquinone, 7.7 parts of thiophenol-ortho-carboxylic acid, 10 parts of potassium carbonate and 300 parts of amyl alcohol are heated to boiling for 18 hours in a reflux apparatus. After this operation the amyl alcohol is expelled by steam distillation, the remaining orange solution is filtered to remove a small quantity of unchanged parent material and the new compound of the probable formula

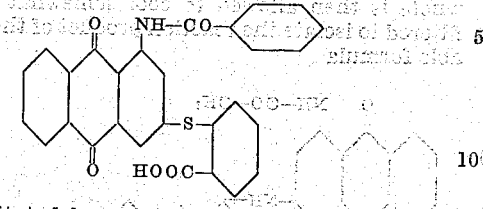

is precipitated by acidifying the filtrate with a mineral acid. When dried it constitutes a crystalline red powder. It dissolves in sulfuric acid of 97 per cent. strength to a yellow solution; when the sulfuric acid solution is poured into water there are precipitated red orange flakes which dissolve to an orange solution on the addition of sufficient aqueous ammonia.

Example 10

10 parts of 1-benzoylamido-3-bromanthraquinone, 10 parts of 4-amino-4'-chloro-2,1-anthraquinonethioxanthone, 5 parts of anhydrous sodium acetate, 1 part of copper acetate and 400 parts of nitrobenzene are heated to boiling for 20 hours in a reflux apparatus. The reaction product is isolated by filtering whilst still hot and washed with nitrobenzene, then with alcohol and finally with hot water. The new compound of the probable formula

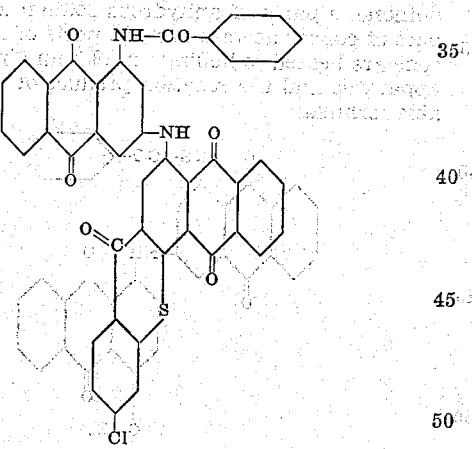

dissolves in sulfuric acid of 100 per cent. strength to a blue solution, whilst the parent materials dissolve in the same solvent to an orange solution. The product may be recrystallized from boiling nitrobenzene, whereby it is obtained in the form of very fine small needles. After the dyestuff has been reprecipitated from its solution in sulfuric acid of 100 per cent. strength, it dyes cotton in a cold or heated vat powerful grey tints having very good properties of fastness.

If in this example the 4-amino-4'-chloro-2,1-anthraquinonethioxanthone is replaced by another highly condensed diketone containing an amino-group, such as 5-amino-2,1-anthraquinoneacridone, amino-pyranthrone, amino-dibenzanthrone, 5:5'-diamino-1,1'-anthrimide-carbazole, there are obtained dyestuffs which dye cotton violet-brown or black-olive or dark green or red-brown respectively.

Example 11

17.2 parts of 1-acetylamido-3-bromanthraquinone, 6 parts of 1,5-diaminoanthraquinone, 8 parts of anhydrous sodium acetate, 1 part of copper acetate and 200 parts of nitrobenzene are heated to boiling for 18 hours in a reflux apparatus. The whole is then allowed to cool somewhat and is filtered to isolate the reaction product of the probable formula

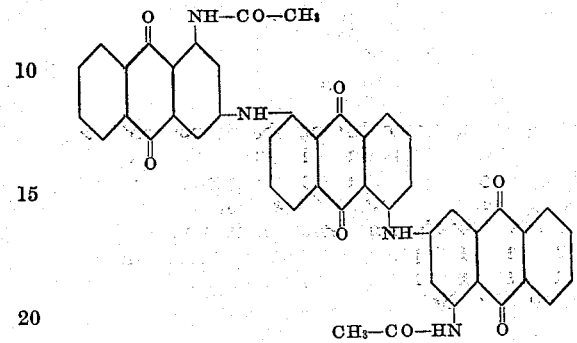

which is separated in the form of beautiful crystals. It dissolves in sulfuric acid of 98 per cent. strength to a pure blue solution from which on pouring into water it is reprecipitated in the form of blue-red flakes. The product dyes cotton in a cold or heated vat very fast bordeaux red shades.

*Example 12*

7.3 parts of 1-benzoyl-amido-3-chloranthraquinone, 5.5 parts of 1,4-aminomethoxyanthraquinone, 5 parts of anhydrous sodium acetate, 1 part of copper acetate and 150 parts of nitrobenzene are heated to boiling for 18 hours in a reflux apparatus and the reaction product of the probable formula

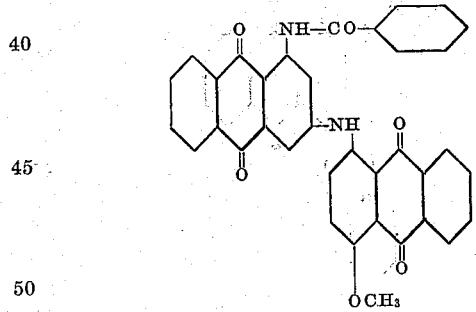

is then isolated by cooling to 40–50° C. and filtering. The product constitutes well formed crystalline needles and is soluble in sulfuric acid monohydrate to a greenish-blue solution. It dyes cotton in a cold or heated vat fast bluish-bordeaux shades.

*Example 13*

1 gram of the dyestuff made as described in Example 6, 5 cc. of caustic soda solution of 36° Bé. and 100 cc. of water at 25–30° C. are made into a paste, 2 grams of hydrosulfite conc. powder are added and vatting is continued for ½ hour at the above temperature. To this dye-bath there are added 3 cc. of caustic soda solution of 36° Bé. and 1 gram of hydrosulfite and the whole is made up, including the stock vat, to 2 litres and the stock vat is added. The goods are entered at 25–30° C. and handled for ¼ hour. There are then added 20 grams of sodium chloride or calcined sodium sulfate and dyeing is continued for 1 hour at 25–30° C. After winding off, the goods are oxidized for ½ hour in the air, rinsed, soured, rinsed and soaped at the boil. Orange tints are obtained.

What we claim is:—

1. As new products the anthraquinone derivatives of the general formula

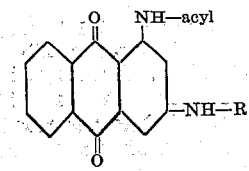

in which R represents hydrogen, alkyl, phenyl, naphthyl or the radical of a higher condensed ring system, which products form yellow to orange to brown to red to violet to green powders which dissolve in concentrated sulfuric acid to yellow to red to blue solutions and dye cotton from the vat yellow to red to blue to green to black tints of very good fastness properties.

2. As new products the anthraquinone derivatives of the general formula

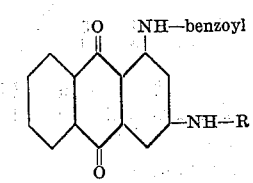

in which R represents hydrogen, alkyl, phenyl, naphthyl or the radical of a higher condensed ring system, which products form yellow to orange to brown to red to violet to green powders which dissolve in concentrated sulfuric acid to yellow to red to blue solutions and dye cotton from the vat yellow to red to blue to green to black tints of very good fastness properties.

3. As new products the anthraquinone derivatives of the general formula

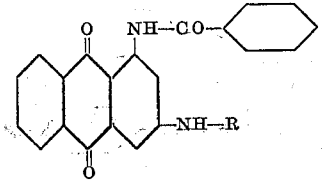

in which R represents hydrogen, alkyl, phenyl, naphthyl or the radical of a higher condensed ring system, which products form yellow to orange to brown to red to violet to green powders which dissolve in concentrated sulfuric acid to yellow to red to blue solutions and dye cotton from the vat yellow to red to blue to green to black tints of very good fastness properties.

4. As new products the anthraquinone derivatives of the general formula

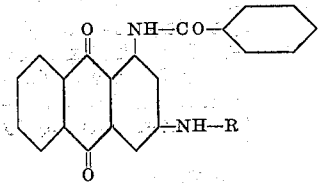

in which R represents the radical of a higher condensed ring system, which products form orange to red to violet to green powders which dissolve in concentrated sulfuric acid to red to blue solutions and dye cotton from the vat red to blue to green to black tints of very good fastness properties.

5. As new products the anthraquinone derivatives of the general formula

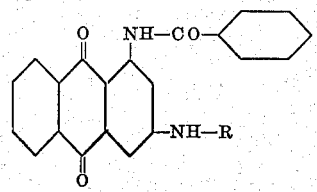

in which R represents an anthraquinone radical, which products form orange to red to violet to green powders which dissolve in concentrated sulfuric acid to red to blue solutions and dye cotton from the vat red to blue to green to black tints of very good fastness properties.

HERMANN HAUSER.
MAX BOMMER.